United States Patent [19]

Loladze et al.

[11] 4,205,933
[45] Jun. 3, 1980

[54] METHOD FOR MACHINING OUTER SURFACES OF BODIES OF REVOLUTION

[76] Inventors: Teimuraz N. Loladze, ulitsa Lenina, 75, kv. 33; Dmitry A. Kiknadze, prospekt Plekhanova, 179, A; Givi I. Razmadze, ulitsa Dzhaparidze, 13; Otar B Mgaloblishvili, ulitsa Krasnopartizanskaya, 8; Merab G. Shvangiradze, ulitsa Ordzhonikidze, 23; Omar G. Rukhadze, poselok Rem. zavoda 2; Vasily S. Khomasuridze, ulitsa Atenskaya, 6; Zhora D. Chaya, prospekt Tsereteli, korpus 13, kv. 20, all of Tbilisi; Konstantin S. Tolstopyatov, ulitsa Pervomaiskaya, 30, kv. 24, Elektrostal Moskovskoi oblasti, all of U.S.S.R.

[21] Appl. No.: 903,777

[22] Filed: May 5, 1978

[51] Int. Cl.$^2$ ............................................. B23C 3/04
[52] U.S. Cl. ................................... 409/132; 409/189; 409/199
[58] Field of Search ............... 9/11 C, 11 R, 14, 15 R, 9/DIG. 1

[56] References Cited

U.S. PATENT DOCUMENTS

| | | | |
|---|---|---|---|
| 3,602,093 | 8/1971 | Fischer | 90/11 C X |
| 3,741,070 | 6/1973 | Berthiez | 90/15 R |
| 4,054,081 | 10/1977 | Brown | 90/11 C |
| 4,066,728 | 1/1978 | Behme et al. | 90/11 C |

Primary Examiner—Gil Weidenfeld
Attorney, Agent, or Firm—Haseltine, Lake & Waters

[57] ABSTRACT

A method of machining outer surface of bodies of revolution by way of cutting, wherein a blank and a cutting tool are rotated about their axes, arranged out of line in mutually perpendicular planes, and are moved relative to each other at the beginning of a pass in the direction perpendicular to the blank surface being machined for cutting-in through the cutting depth, while the length of the cutting edge of the cutting tool is selected such that it spans the width of the blank cutting surface and, in the course of the cutting tool rotation, successively passes the blank cutting surface over the entire length thereof.

The cutting machine for accomplishing the above process, has bed stocks which are mounted for positioning and rotating the blank being machined, and a rest arranged in guides provided in the bed. The rest is designed to carry a cutting tool with end cutters mounted on the rest for rotation about an axis arranged out of line with the centerline of the stocks in a plane perpendicular to the plane passing through the centerline of the stocks. The rest is mounted in the guides provided in the bed parallel with the rotation axis of the cutting tool whose end has a diameter somewhat greater than the distance between the stock centers in the course of cutting, while the cutters are arranged essentially radially at the end face and have a cutting edge length somewhat smaller than the length of the end face radius.

1 Claim, 12 Drawing Figures

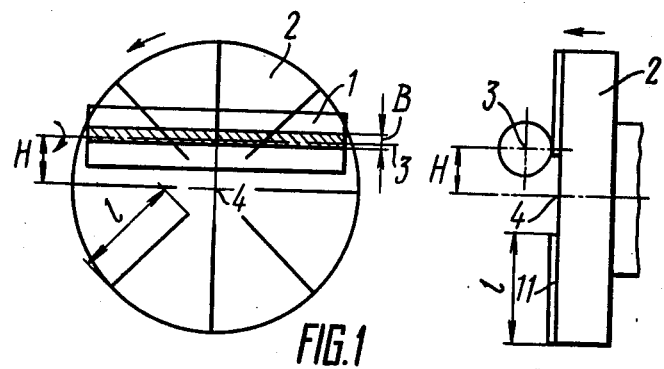
FIG.1
FIG.3
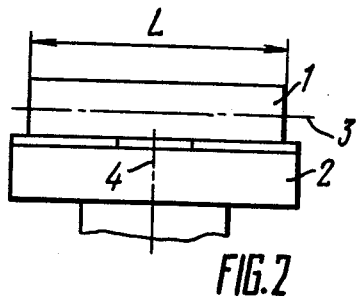
FIG.2
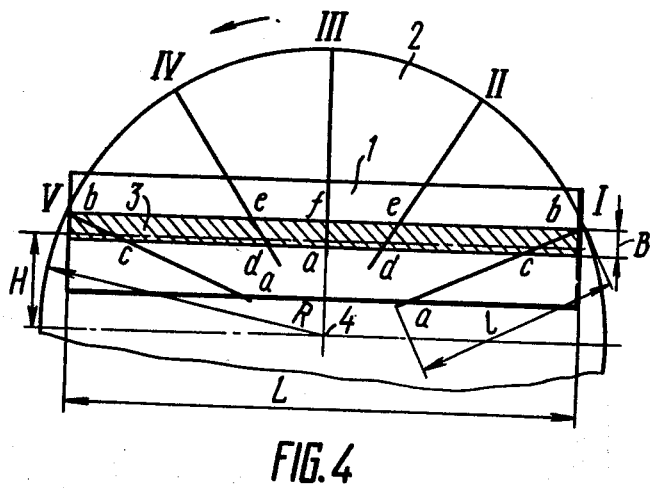
FIG.4

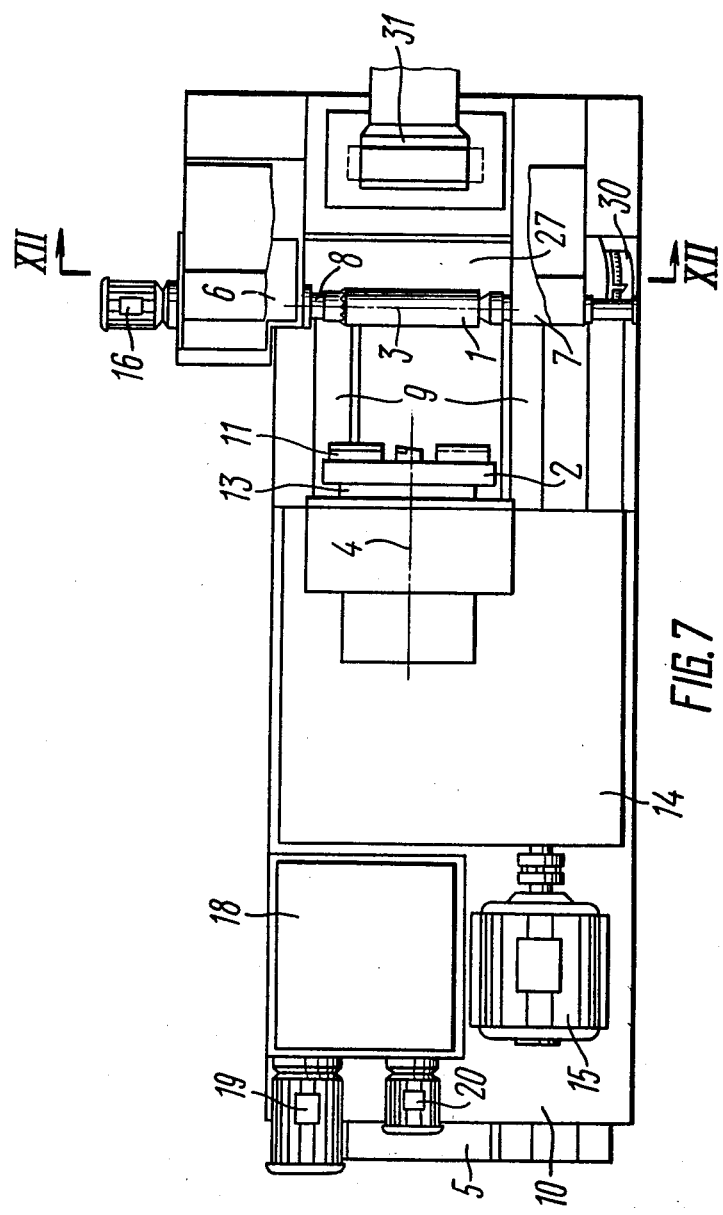

METHOD FOR MACHINING OUTER SURFACES OF BODIES OF REVOLUTION

The present invention relates to machine-tool manufacture and, more particularly, it relates to methods of machining outer surfaces of bodies of revolution by way of cutting and to cutting machines designed for accomplishing said processes.

FIELD OF THE INVENTION

It is most expedient to use the method of and cutting machine for machining outer surface of bodies of revolution, embodying the present invention, in metallurgy for removing defective layers from the surfaces of ingots having the shape of bodies of revolution (cylindrical and conical). The defective layer can be removed from both cold and hot ingots.

The herein disclosed method and machine can be also used in mechanical engineering for machining bodies of revolution.

PROTOTYPE AND DISADVANTAGES INHERENT THEREIN

Known in the art are methods of machining outer surface of bodies of revolution, where a blank and a cutting tool are rotated about their axes, arranged out of line in mutually perpendicular planes, and perform forward movement relative to each other for removing a present layer.

Also known in the art are cutting machines designed to accomplish the prior art method, comprising a headstock and a tailstock mounted on a bed and serving to accommodate a blank being machined.

The headstock accommodates a spindle for rotating the blank.

Provided on the bed, parallel with the centerline of the stocks, are guides designed to the accommodation and movement of a rest carrying a cutting tool, i.e., end cutters mounted on said rest with a possibility of rotation.

The cutters are arranged on both sides of the blank and mounted on the rest such that their rotation axes are offset in the vertical plane with respect to the centerline counter to the direction of the blank rotation. The rotation axes of the cutters and the centerline of the stocks are located in mutually perpendicular planes. In the course of cutting, the blank is rotated while the cutters are in rotation and have motion, together with the rest, in the guides of the bed.

For accomplishing the prior art method, in cutting machines, use is made of end cutters having main cutting edges of their teeth arranged in a single plane perpendicular to the axis of rotation while the auxiliary cutting edges of the teeth lie on the peripheral side of the cutter.

However, an increase of the length of the main cutting edge and of the cutter diameter results in an increase of the helix angle of machining, which, in its turn, serves to increase the feed $S_z$ upon the auxiliary cutting edge and, after the feed reaches its limiting value, brittle failure of the cutting portion of the tool occurs. Therefore, the presence of auxiliary cutting edges in the cutter teeth (the absence of pointless free cutting) serves as a factor for inhibiting machining efficiency according to this prior art method.

Although the term "pointless free cutting" may be clear to a limited number of those skilled in the art, in order to avoid misunderstanding it is to be pointed out, that in the present specification, this term is used with reference to the case when only a single straight-line cutting edge takes part in the cutting method.

The prior art cutting machines, while being of relatively complex design, fail to ensure any considerable increase in the efficiency of machining and, as a result, find but a limited application in industry.

At present, the machining of outer surface of cylindrical and conical blanks, in particular, the removal of high allowances including the removal of defective layer from the ingot surface, is carried in turning lathes and ingot slicing machines.

The machining efficiency in stripping operations is still very low, this causing a considerable increase of the stock of turning lathes in stripping shops of metallurgical and mechanical factories, accompanied with increased demands for more production space.

OBJECTS AND BRIEF DESCRIPTION OF THE PRESENT INVENTION

It is an object of the present invention to develop a method of machining outer surface of bodies of revolution, that would facilitate pointless cutting, i.e., free cutting with portions of the tool cutting edge successively making contact with the blank surface being machined, and a cutting machine for the most efficient realization of the disclosed method.

It is another object of the present invention to increase the efficiency of machining.

It is still another object of the present invention to prolong the cutting-tool life.

It is further object of the present invention to reduce the stock of machines required for the roughing of blanks and, consequently, save the metal required for manufacturing said stock of machines.

It is yet further object of the present invention to cut on the production space required to accommodate cutting machines.

The present invention consists essentially in that in a method for machining outer surface of bodies of revolution by way of cutting, wherein a blank and a cutting tool are rotated about their axes, arranged out of line in mutually perpendicular planes, and are moved relative to each other. According to the invention, the relative movement of the blank and cutting tool is performed at the beginning of a pass in the direction perpendicular to the blank surface being machined for cutting-in through the cutting depth, the length of the cutting edge of the cutting tool being selected such as to span the width of the blank cutting surface and, in the course of the cutting tool rotation, to pass successively the blank cutting surface over the entire length thereof.

A cutting machine for accomplishing the method, on whose bed two stocks are mounted for positioning a blank being machined, one of said stocks having a spindle for rotating the blank in the course of cutting, and a rest is arranged in guides provided in the bed, said rest is designed to carry a cutting tool with end cutters mounted on the rest with a possibility of rotation about an axis arranged out of line with the centerline of the stocks in a plane perpendicular to the plane passing through the centerline of the stocks, is characterized, according to the invention, in that the guides for the rest are made in the bed transversely to the centerline of the stocks and parallel with the rotation axis of the cutting tool whose end has a diameter somewhat greater than the distance between the centers of the stocks in the course of cutting, while the cutters are arranged essentially radially at the end face and have a cutting edge length somewhat smaller than the length of the end face radius, and in that said machine is provided with a mechanism for locking the rest in position after the cutting tool has cut-in through a preset cutting depth.

Such a design of the cutting machine makes it possible to increase the efficiency of roughing the blanks owing to an increase in the length of the tool cutting edge, which resulted in an increased width of a layer removed by each cutter and prolonged cutting-tool life thanks to free cutting and successive introduction of portions of the tool cutting edge into contact with the surface being machined.

It is expedient that the stocks for positioning the blank be rigidly interconnected by means of a beam extending above said stocks.

In the cutting machine of the present invention the main components of the cutting forces are directed along the centerline of the stocks and are taken up by one of the latter. In addition, this latter stock is acted upon by the forces resulting from the pressing of the blank by the center of the other stock in the course of machining, this causing deformation and adversely affecting the rigidity of the machine system. The interconnection of the stocks by means of a beam serves to increase the rigidity of the machine and preclude bending strains of the bed.

It is likewise expedient that the stocks for positioning the blank be arranged on a plate mounted on the bed with a possibility of rotation.

Such an arrangement of the stocks is essential when using the machine of the invention for machining conical blanks (ingots) sure it is required that the surface being machined should be placed normal to the rotation axis of the cutting tool.

It is also expedient that the mechanism for locking the rest in position include a clamp cooperating with the rest and the bed, and an actuating cylinder whose moving link is operatively connected with said clamp for opening and closing the latter.

Such an arrangement of the mechanism for locking the rest in position proves to be the most simple and reliable structural solution in the course of the machine operation.

The disclosed method of machining the surface of bodies of revolution helps to increase the efficiency of the roughing of hot blanks by 10–15 times as compared to turning of cold blanks, currently used in industry.

The cutting machine of the present invention for accomplishing the disclosed method, while relatively simple in design, makes for an average reduction of the machining time by 10–15 times as compared to turning lathes currently used for roughing. This, in turn, helps reduce the stock of machines and, consequently, production space required to accommodate said machines.

BRIEF DESCRIPTION OF DRAWINGS

Given below is the description of a specific embodiment of the present invention with reference to the accompanying drawings in which:

FIG. 1 shows diagrammatically the position of the blank and cutting tool, front view;

FIG. 2 illustrates a plan view of my invention;

FIG. 3 illustrates a side view of my invention;

FIG. 4 shows diagrammatically the successive introduction of portions of the cutting edge into contact with the blank surface being machined;

FIG. 7 illustrates a plan view of FIG. 5;

DETAILED DESCRIPTION OF SPECIFIC EMBODIMENT

The method of machining an outer surface of bodies of revolution by way of cutting, according to the invention, resides in the following: a blank 1 (FIG. 1) and a cutting tool 2 are rotated about their respective axes 3 and 4 (FIGS. 2, 3) and moved relative to each other for removing a preset layer.

The axes 3 and 4 are arranged in mutually perpendicular planes and are offset with respect to each other through some value H.

The relative movement of the blank 1 and the cutting tool 2 is performed at the beginning of a pass in the direction perpendicular to the surface of the blank 1 being machined through the cutting depth.

The length 1 (FIG. 1) of the cutting edge of the cutting tool 2 is selected such as to span the width B of the cutting surface of the blank 1. In the course of rotation of the cutting tool 2, the cutting edge passes with its portions successively over the entire length L (FIG. 4), as evident from positions I, II, III, IV, V of the cutting edge relative to the cutting surface of the blank 1.

The method of the invention will be disclosed more in detail upon describing a cutting machine designed to accomplish the method.

Figure 5:
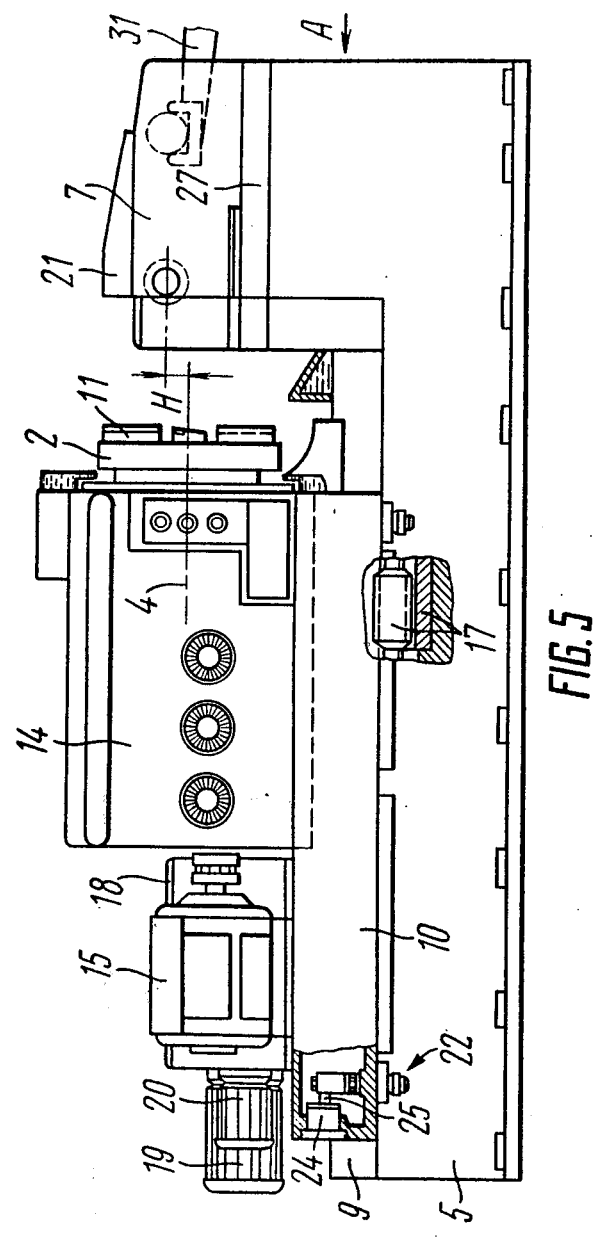
FIG. 5 is a side elevation of the cutting machine according to the invention.
Figure 6:
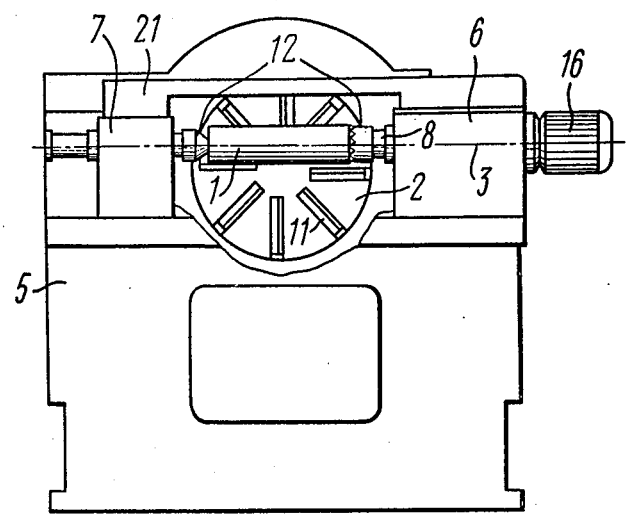
FIG. 6 illustrates a view along arrow A of FIG. 5.

The cutting machine of the invention comprises a bed 5 (FIG. 5) mounting stocks 6 (FIG. 6) and 7 for positioning the blank 1 being machined.

The stock 6 has a spindle 8 for rotating the blank 1 in the course of cutting about the geometric axis 3. The bed 5 is provided with guides 9 (FIGS. 5 and 7) designed to accommodate a rest 10 carrying the cutting tool 2 with end cutters 11. The cutting tool is mounted with a possibility of rotation about the geometric axis 4. The axis 4 is arranged with an offset H (FIG. 5) relative to the line of centers 12 of the stocks 6 (FIG. 6) and 7, i.e., the axis 3, in a plane perpendicular to the plane passing through the axis 3.

The axis 4 is normal to the surface of the blank 1 being machined. As seen from FIG. 7, if the blank has a cylindrical shape, the guides 9 and axis 4 are normal to the line of centers 12 of the stocks, i.e., to the axis 3.

The tool 2 is rotated by means of a spindle 13 connected via gear box 14 to an electric motor 15. The spindle 8 is operatively connected to an electric motor 16.

The cutters 11 are arranged essentially radially at the end face of the cutting tool 2 and have a length 1 (FIG. 1) of the cutting edge somewhat smaller than the length R of the end face radius (FIG. 4), sufficient to span the width B of the cutting edge of the blank 1.

The end face of the cutting tool 2 has a diameter somewhat greater than the distance between the centers 12 (FIG. 6) of the stocks 6 and 7 in the course of cutting, i.e., with the blank 1 gripped.

The diameter (2R) (FIG. 4) of the end face of the cutting tool 2 is the diameter of a circle passing through peripheral points of the cutting edges of the cutters 11 (FIG. 6), removed from the center.

Such length of the cutting edge of the cutter 11 and the offset of the axis 4 relative to the axis 3 facilitate a successive introduction of each portion of the cutting edge of the cutter 11 into contact with the cutting surface of the blank 1.

The rest 10 (FIG. 5) has a feed mechanism for cutting in the cutting tool 2 through the cutting depth. The feed mechanism comprises a worm-and-rack pair 17 operatively connected via gear box 18 to motors 19 and 20.

The motor 19 is designed for moving the rest upon cutting-in, i.e., for the working stroke, and the motor 20—for accelerating idle strokes.

When selecting the length 1 (FIG. 4) of the cutting edge somewhat smaller than the radius R of the cutting tool end face, and the diameter of the cutting tool 2 somewhat greater than the distance between the centers 12 (FIG. 6) of the stocks 6 and 7 in the course of cutting, i.e., with the blank 1 gripped, as well as when setting the axis 4 out of line with the axis 3, the main components of the cutting forces are directed along the centerline of the stocks 6 and 7 and taken up by the stock 6. In addition, the stock 6 is acted upon by the forces resulting from the pressing of the blank 1 by the center of the stock 7 in the course of machining, this causes deformation and adversely affects the rigidity of the machine system. Therefore, the stocks 6 and 7 are interconnected by means of a beam 21 passing thereabove, which results in a closed rigid system of bed 5-stock 6-beam 21-stock 7-bed 5.

Figure 8:
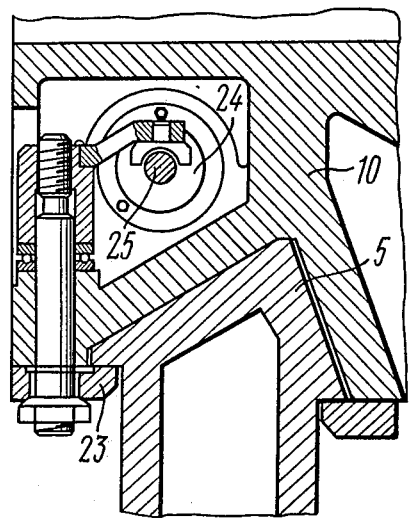
FIG. 8 illustrates the mechanism for locking the rest in position, according to the invention.

For locking the rest 10 (FIG. 5) in position relative to the bed 5 after cutting-in through the cutting depth, the bed is provided with a locking mechanism 22. The locking mechanism 22 includes a clamp 23 (FIG. 8) cooperating with the rest 10 and bed 5, and an actuating cylinder 24 whose moving link, i.e., rod 25, is operatively connected with the clamp 23 for opening and closing the latter.

Figure 9:
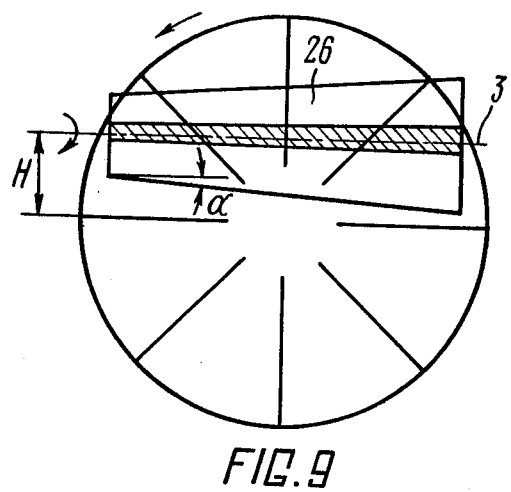
FIG. 9 shows diagrammatically the position of a conical blank relative to the cutting tool, front view.
Figure 11:
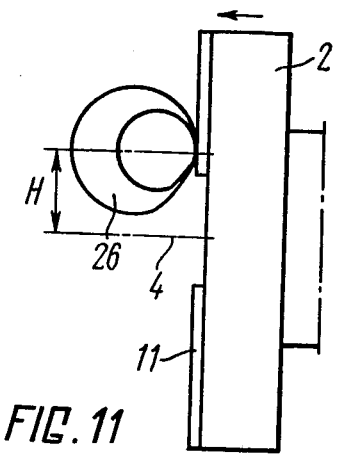
FIG. 11 illustrates a side view of FIG. 9.
Figure 10:
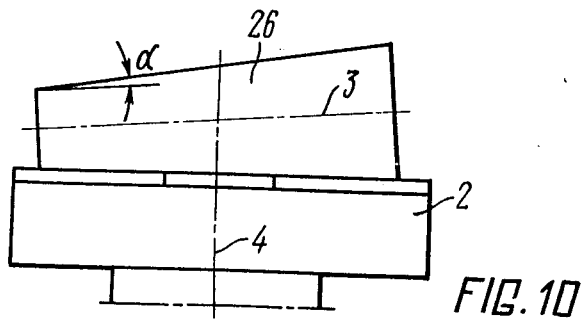
FIG. 10 illustrates a plan view of FIG. 9.
Figure 12:
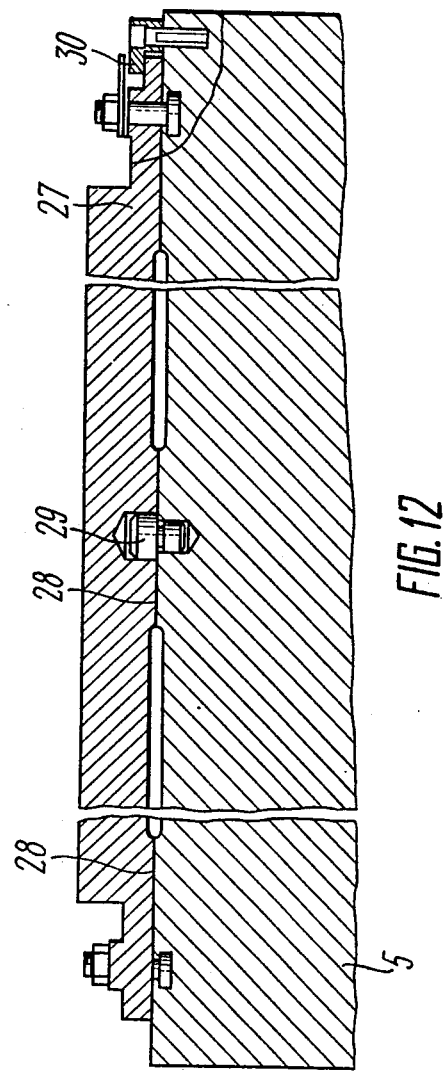
FIG. 12 is a section taken on line XII—XII of FIG. 7.

For using the machine of the invention for machining blanks 26 (FIGS. 9, 10, 11) of conical shape, the stocks 6 (FIG. 6) and 7 are arranged on a plate 27 (FIG. 7) mounted on the bed 5 in guides 28 (FIG. 12).

The plate 27 is mounted for rotation about an axis 29 through an angle $\alpha$ (FIGS. 9, 10) equal to the angle of taper of the blank 26 being machined, for placing the surface of the blank 26 being machined normal to the axis 4 of the cutting tool 2.

The angle of rotation of the plate is indicated by a box rule 30 (FIG. 12) attached to the bed 5.

The cutting machine of the present invention operates in the following manner.

A charging-discharging device 31 (FIGS. 5 and 7) fashioned as a manipulator delivers the cylindrical blank 1 to the machine such that the axis of the blank 1 coincides with the centerline 12 of the stocks 6 and 7, i.e., with the axis 3. After that, the blank 1 is gripped with the aid of the tail spindle of the stock 7 and centered with respect to the centers 12, the charging device 31 is withdrawn, and the blank 1 has imparted thereto rotary motion transmitted from the motor 16 via spindle 8 provided in the stock 6, while the cutting tool 2 has imparted thereto, rotary motion through the intermediary of the spindle 13, transmitted from the motor 15 via gear box 14.

Further, the worm-and-rack pair 17, gear box 18 and the motors 19 and 20 are instrumental in executing a fast delivery, and then working stroke, of the rest 10 for the cutting-in of the cutting tool 2 through the desired cutting depth.

After the tool 2 has cut-in through the desired cutting depth, the working stroke of the rest 10 is discontinued and the actuating cylinder 24 of the locking mechanism 22 is switched on to operate the clamps 23 by means of the rod 25 and to lock the rest 10 in position relative to the bed 5.

Machining is done under conditions of relative rotation of the blank 1 and cutting tool 2. In the course of rotation of the cutting tool 2, different portions of the cutting edge participate in the cutting method. For example, in position I (FIG. 4) the working portion of the cutting edge ab is the portion bc, while in position II the working portion of the cutting edge ab is the portion de, and in position III—the portion fa. Thus, with the cutting edge ab rotating from position I to position III, the working portion of the cutting edge ab shifts from point b to point a. Analogously, upon further rotation of the cutting edge ab from position III to positions IV and V, the working portion shifts from point a to point b.

After the machining of the blank 1 is over, the actuating cylinder 24 acts to open the clamps 23 of the locking mechanism 22, the rest 10, is rapidly withdrawn, the spindles 8 and 13 for rotating the blank 1 and cutting tool 2 are switched off, the charging-discharging device 31 brought in, the center of the stock 7 removed, and the blank 1 is delivered by means of the device 31 to a conveying device (not shown). After that, the cycle is repeated.

For machining the blanks 26 (FIGS. 9, 10, 11) of conical shape in the machine of the invention, the plate 27 is turned about the axis 29 through some angle $\alpha$ equal to the angle of taper of the blank 26, the angle $\alpha$ being counted from the box rule 30 such that the surface being machined be normal to the axis 4 of the cutting tool 2, after which the procedure of machining the conical blank is analogous to that of machining the cylindrical blank described above.

The experimental prototype of the disclosed machine was subjected to testing. The cutting tool was fitted with a single cutter. Hot alloyed-steel blanks having the dimensions of L=650–700 mm and d=165 mm were machined for 3–5 minutes. The time of machining such blanks in a commercially produced machine of the invention with a cutting tool fitted with 6–8 cutters would be 1–1.2 min. The time of machining the same blanks in cold state in a currently used turning lathe is equal to 20–24 minutes.

We claim:

1. A method of machining the entire peripheral surface of an elongated work piece comprising the step of: positioning the elongated work piece so that its longitudinal axis is substantially offset from the axis of a rotary cutting tool, providing the cutting tool with end face cutting edges that will span the entire length of the work piece during each rotation of the cutting tool, rotating said cutting tool and supporting the work piece for non-rotation during a cutting-in operation, displacing the work piece and the cutting tool relative to each other along the axis of the cutting tool to a predetermined depth during the cutting-in operation, and then rotating the work piece to cause the entire peripheral surface thereof to be machined by said cutting tool.

* * * * *